US011140241B2

(12) United States Patent
Tellado et al.

(10) Patent No.: US 11,140,241 B2
(45) Date of Patent: *Oct. 5, 2021

(54) IOT HARDWARE CERTIFICATION

(71) Applicant: Microsoft Technology Licensing, LLC, Redmond, WA (US)

(72) Inventors: Hector Garcia Tellado, Seattle, WA (US); Dan Calin Cristoloveanu, Sammamish, WA (US); Samuel John George, Bainbridge Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,625

(22) Filed: Apr. 25, 2020

(65) Prior Publication Data

US 2020/0259929 A1    Aug. 13, 2020

Related U.S. Application Data

(63) Continuation of application No. 16/360,337, filed on Mar. 21, 2019, now Pat. No. 10,637,966, which is a
(Continued)

(51) Int. Cl.
| | |
|---|---|
| *H04L 29/08* | (2006.01) |
| *H04L 12/26* | (2006.01) |
| *G06F 21/12* | (2013.01) |
| *H04L 12/24* | (2006.01) |
| *G06F 21/33* | (2013.01) |
| *G06F 21/44* | (2013.01) |
| *G06F 8/61* | (2018.01) |
| *H04W 4/70* | (2018.01) |

(52) U.S. Cl.
CPC ............ *H04L 67/34* (2013.01); *G06F 21/121* (2013.01); *G06F 21/33* (2013.01); *G06F 21/44* (2013.01); *H04L 41/0866* (2013.01); *H04L 43/10* (2013.01); *H04L 43/50* (2013.01); *G06F 8/61* (2013.01); *H04W 4/70* (2018.02)

(58) Field of Classification Search
CPC ... H04L 67/125; H04L 41/0803; H04L 41/08; H04L 41/0806
See application file for complete search history.

(56) References Cited

U.S. PATENT DOCUMENTS 9,210,534 B1 * 12/2015 Matthieu ................. H04L 67/18
2006/0236097 A1 * 10/2006 Prologo .............. H04L 63/0823
713/156

(Continued)

*Primary Examiner* — Shean Tokuta
(74) *Attorney, Agent, or Firm* — Davin Chin; Chin IP, PLLC

(57) ABSTRACT

The disclosed technology is generally directed to device certification in an IoT environment. For example, such technology is usable in managing relationships between IoT devices and an IoT Hub. In one example of the technology, an IoT Hub receives a registration request. Next, the IoT Hub sends a registration verification to the IoT device. Next, the IoT Hub receives a ping from the IoT device. Next, the IoT Hub sends a response to the ping to the IoT device. Next, the IoT Hub receives verification of a validation of a log file output by a device based on running a plurality of unit tests on a device with a software development kit. Next, the IoT Hub automatically sends code to the IoT device.

20 Claims, 11 Drawing Sheets

Related U.S. Application Data continuation of application No. 15/265,483, filed on Sep. 14, 2016, now Pat. No. 10,284,684.

(56) References Cited

U.S. PATENT DOCUMENTS

| | | | |
|---|---|---|---|
| 2008/0045267 A1* | 2/2008 | Hind | H04L 67/10 455/557 |
| 2008/0282081 A1* | 11/2008 | Patiejunas | H04L 63/029 713/153 |
| 2012/0047551 A1* | 2/2012 | Pattar | H04W 4/70 726/1 |
| 2012/0185925 A1* | 7/2012 | Barkie | G06F 21/6209 726/7 |
| 2012/0209557 A1* | 8/2012 | Crandall | G05B 19/41885 702/123 |
| 2012/0302229 A1* | 11/2012 | Ronneke | H04L 65/1006 455/422.1 |
| 2013/0041997 A1* | 2/2013 | Li | H04L 67/12 709/223 |
| 2013/0188515 A1* | 7/2013 | Pinheiro | H04W 4/50 370/254 |
| 2013/0212236 A1* | 8/2013 | Foti | H04W 76/10 709/221 |
| 2015/0365217 A1* | 12/2015 | Scholten | H04W 88/04 370/315 |
| 2015/0373481 A1* | 12/2015 | Eom | H04W 48/16 370/329 |
| 2016/0043827 A1* | 2/2016 | Filson | H04K 3/226 370/252 |
| 2016/0044012 A1* | 2/2016 | Carrer | H04W 4/70 726/6 |
| 2016/0087933 A1* | 3/2016 | Johnson | H04L 67/34 709/245 |
| 2016/0171479 A1* | 6/2016 | Prakash | G01D 4/004 705/44 |
| 2016/0195881 A1* | 7/2016 | Britt | G08C 17/02 700/276 |
| 2016/0205078 A1* | 7/2016 | James | H04L 9/006 713/171 |
| 2016/0241893 A1* | 8/2016 | Allhands | H04N 21/4345 |
| 2016/0248746 A1* | 8/2016 | James | H04L 9/3268 |
| 2016/0259932 A1* | 9/2016 | Lakshmanan | G06F 21/44 |
| 2016/0270021 A1* | 9/2016 | Wu | H04L 67/32 |
| 2016/0285628 A1* | 9/2016 | Carrer | H04L 9/321 |
| 2017/0005820 A1* | 1/2017 | Zimmerman | G05B 15/02 |
| 2017/0006132 A1* | 1/2017 | Sorenson, III | H04L 67/28 |
| 2017/0006411 A1* | 1/2017 | Zakaria | H04L 12/283 |
| 2017/0063834 A1* | 3/2017 | Gryb | H04L 63/083 |
| 2017/0099647 A1* | 4/2017 | Shah | H04L 63/0823 |
| 2017/0103015 A1* | 4/2017 | Bosschaert | G06F 11/3688 |
| 2017/0149614 A1* | 5/2017 | Zheng | H04L 63/101 |
| 2017/0171196 A1* | 6/2017 | Britt | H04W 12/06 |
| 2017/0195136 A1* | 7/2017 | Ghosh | H04L 45/04 |
| 2017/0195318 A1* | 7/2017 | Liu | H04L 67/2809 |
| 2017/0195332 A1* | 7/2017 | Wu | H04L 67/10 |
| 2017/0245309 A1* | 8/2017 | Park | H04W 4/02 |
| 2017/0272316 A1* | 9/2017 | Johnson | G06Q 10/103 |
| 2017/0284691 A1* | 10/2017 | Sinha | F24F 11/62 |
| 2017/0302663 A1* | 10/2017 | Nainar | H04W 4/70 |
| 2017/0353859 A1* | 12/2017 | Idnani | H04W 12/08 |
| 2017/0359338 A1* | 12/2017 | Tschofenig | H04L 63/0853 |
| 2018/0109395 A1* | 4/2018 | Berdy | H04L 63/0823 |
| 2018/0137261 A1* | 5/2018 | Lattin | G06F 21/12 |

\* cited by examiner

IOT HARDWARE CERTIFICATION

CROSS-REFERENCE TO RELATED APPLICATION(S)

This application is a continuation of U.S. patent application Ser. No. 16/360,337, filed Mar. 21, 2019, entitled "IOT HARDWARE CERTIFICATION,", which is a continuation of U.S. patent application Ser. No. 15/265,483, filed Sep. 14, 2016, entitled "IOT HARDWARE CERTIFICATION," now U.S. Pat. No. 10,284,684, issued May 7, 2019. The entirety of each of these afore-mentioned application(s) is incorporated herein by reference.

BACKGROUND

The Internet of Things ("IoT") generally refers to a system of devices capable of communicating over a network including the communication of data over the network. The devices can include everybody objects such as toasters, coffee machines, thermostat systems, washers, dryers, lamps, automobiles, and the like. The network communication can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to device certification in an IoT environment. For example, such technology is usable in managing relationships between IoT devices and an IoT Hub. In one example of the technology, an IoT Hub receives a registration request. In some examples, the IoT Hub receives the registration request from a manufacturer. Next, the IoT Hub sends a registration verification to the IoT device. Next, the IoT Hub receives a ping from the IoT device. Next, the IoT Hub sends a response to the ping to the IoT device. Next, the IoT Hub receives verification of a validation of a log file output by a device based on running a plurality of unit tests on a device with a software development kit. More specifically, in some examples, verification is performed on the log file, and, upon successful validation, the verification of the validation of the log file is sent to the IoT Hub. Next, the IoT Hub automatically sends code to the IoT device.

The present technology may allow new hardware devices to begin using IoT services from an IoT Hub relatively quickly. Further, this technology may allow compatibility between a hardware device with cloud services to be signaled relatively quickly, with compatibility ensured upon relatively simple validation. For example, this technology provides a simple way for manufacturers to test their hardware devices with IoT services. Moreover, this technology may be employed to provide certification services to allow manufacturers to claim compatibility with IoT services via a set of instructions that allows manufacturers to test compatibility. Further, developers can easily determine which hardware devices are compatible with IoT services and are provided with tools for readily developing software for IoT devices using IoT services.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Illustrative Devices/Operating Environments

Figure 1:
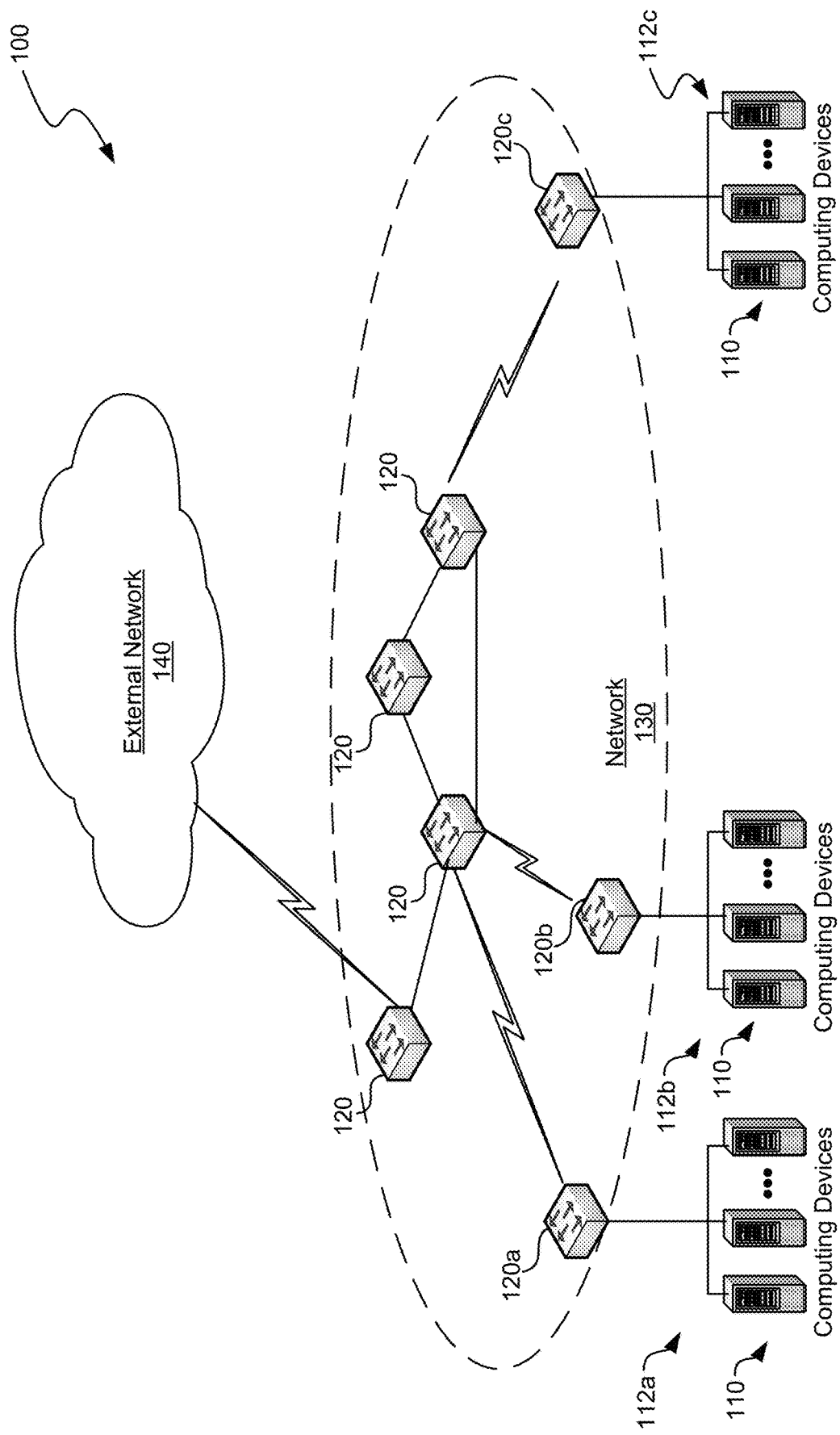
FIG. 1 is a block diagram illustrating one example of a suitable environment in which aspects of the technology may be employed.

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communication between computing devices no and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one of the computing device 110 is an IoT Hub, an IoT device, a support device, a manufacturer device, a developer device, or the like, as discussed in greater detail below.

Illustrative Computing Device

Figure 2:
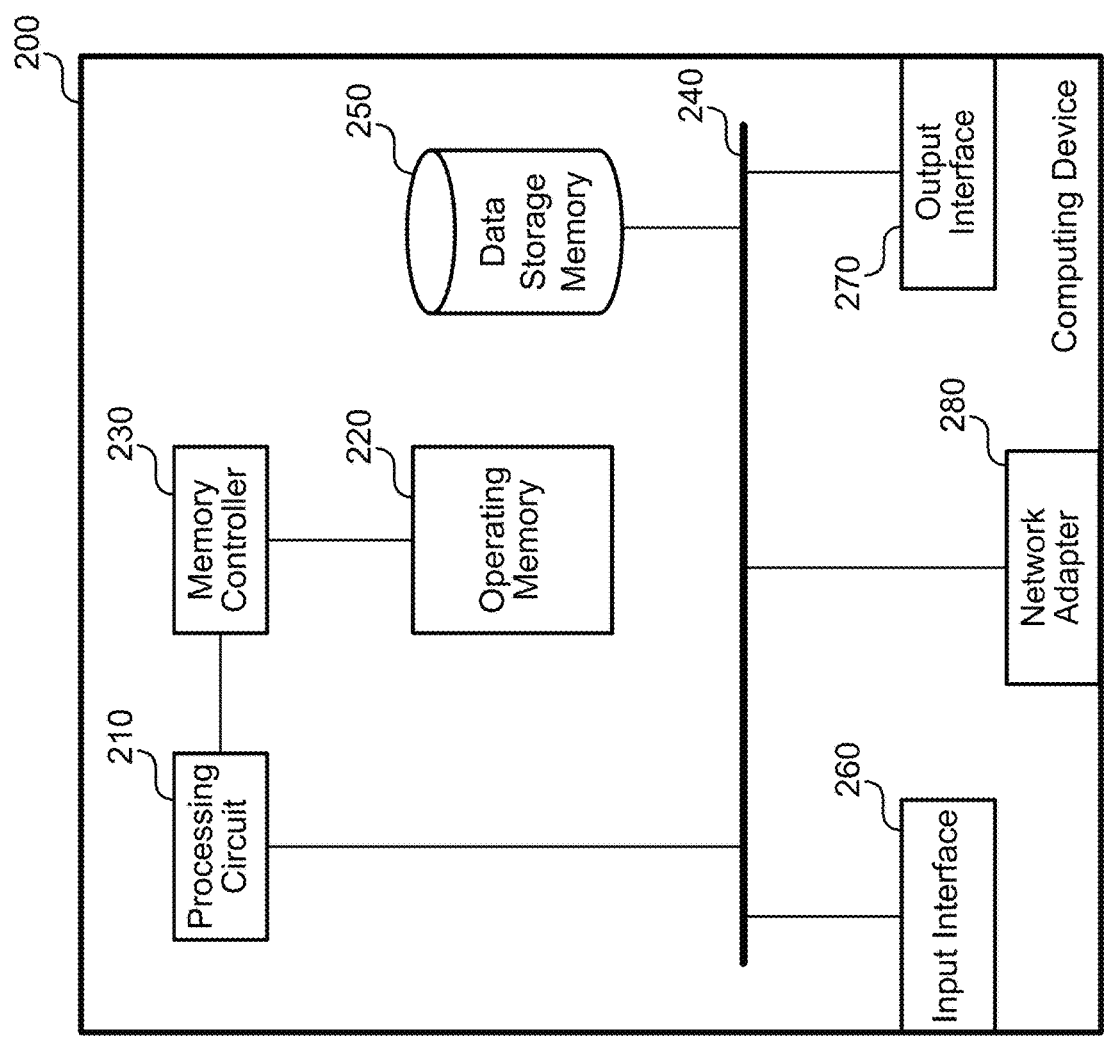
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices illustrated in FIG. 5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR$_4$) memory, $3^{rd}$ generation double data rate (DDR$_3$) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for runtime data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one storage memory (e.g. data storage memory 250), at least one operating memory (e.g., operating memory 220) and at least one processor (e.g., processing unit 210) that are respectively adapted to store and execute processor-executable code that, in response to execution, enables computing device 200 to perform actions.

Illustrative System

Figure 3:
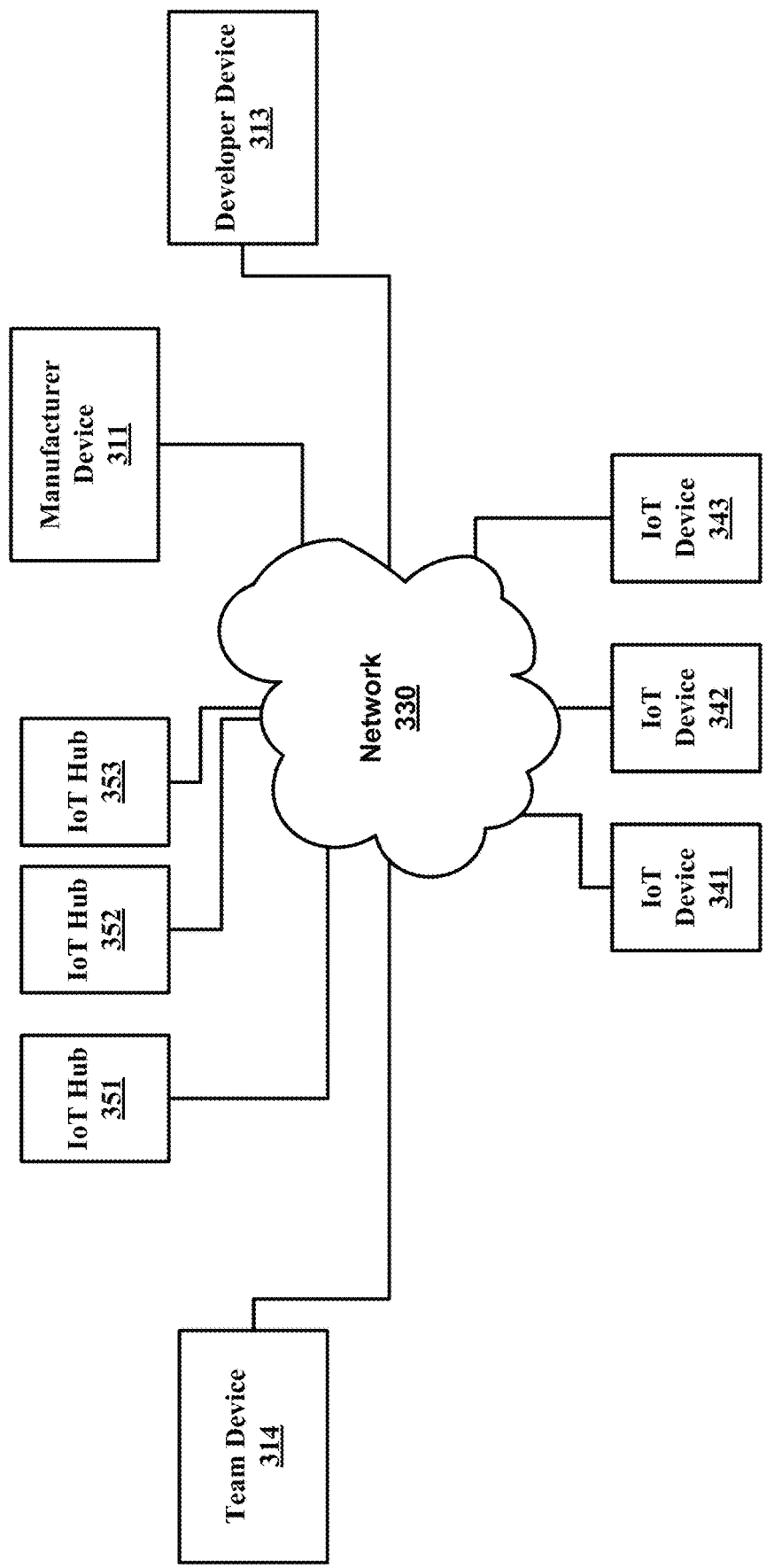
FIG. 3 is a block diagram illustrating an example of a system for hardware IoT certification.
Figure 4A:
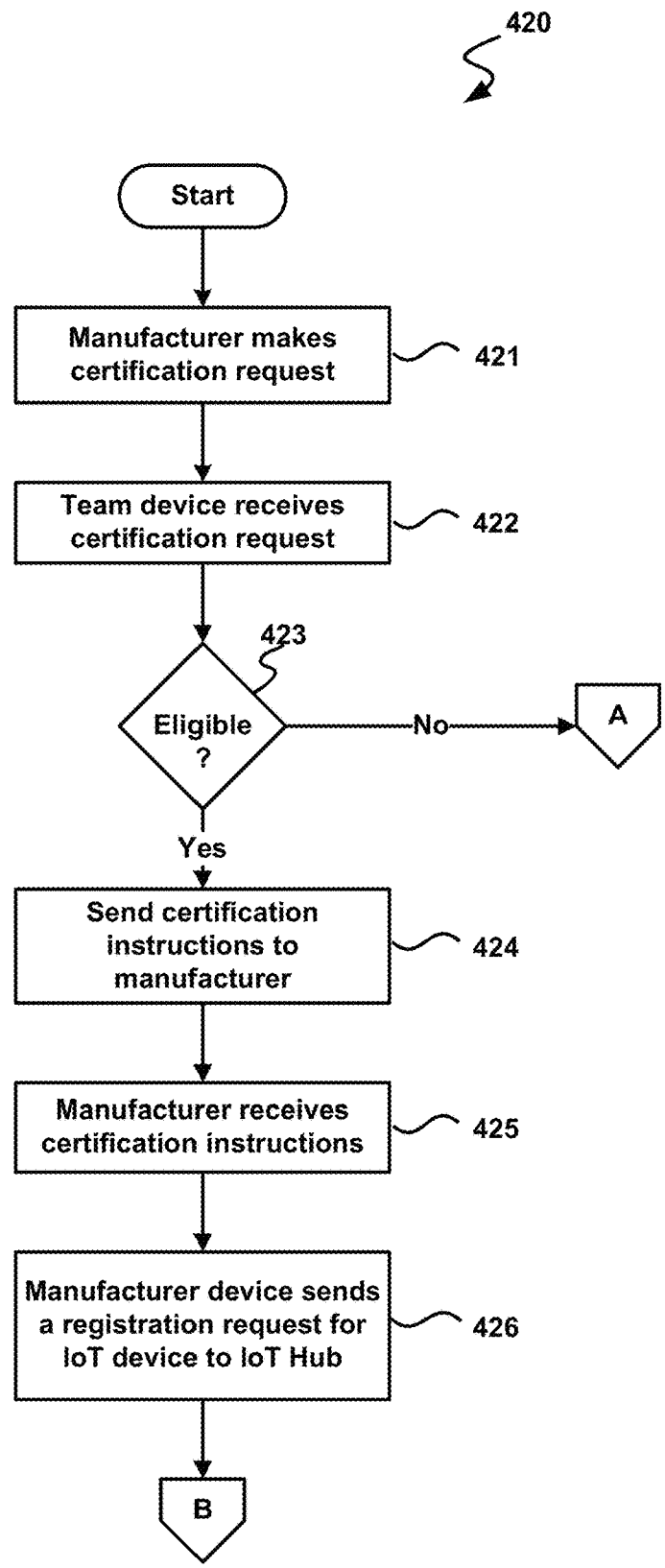
FIGS. 4A-4F illustrate a logical flow diagram of another example of process for hardware IoT certification.
Figure 4B:
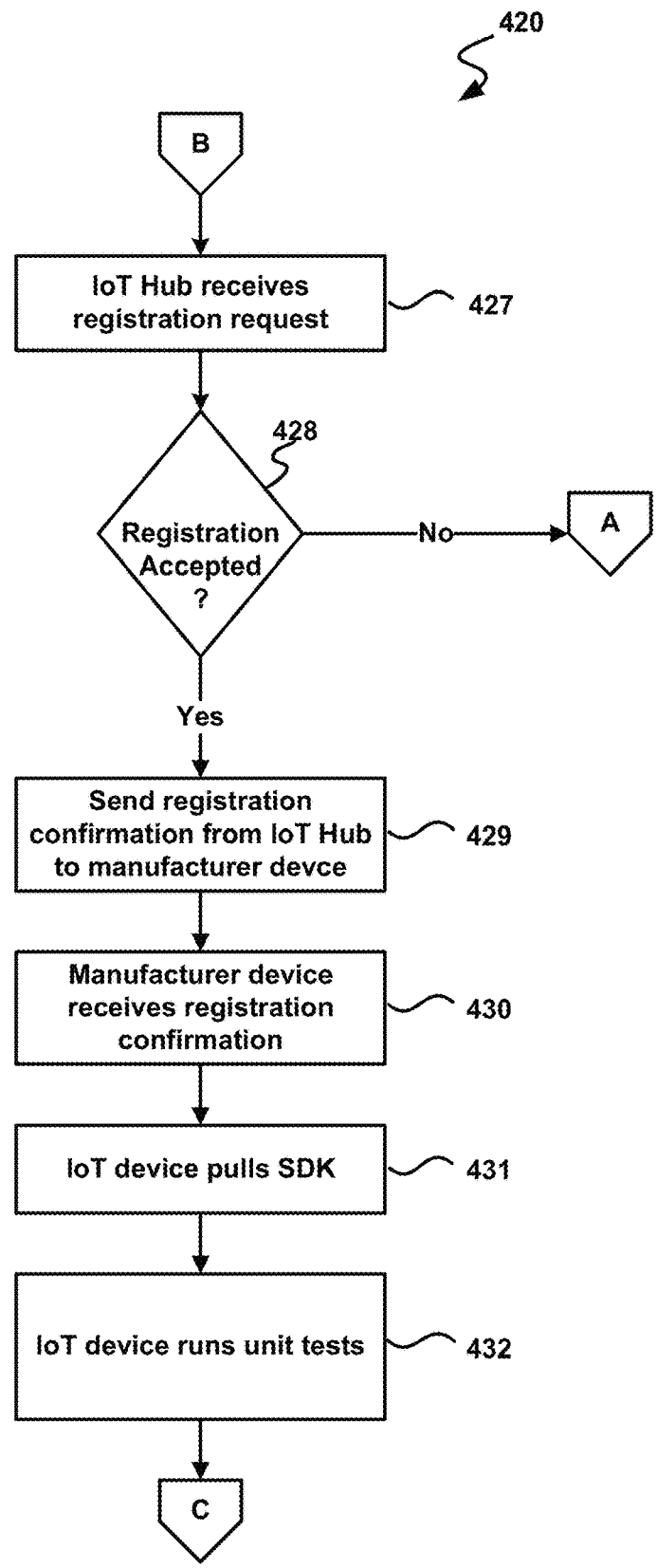
Figure 4C:
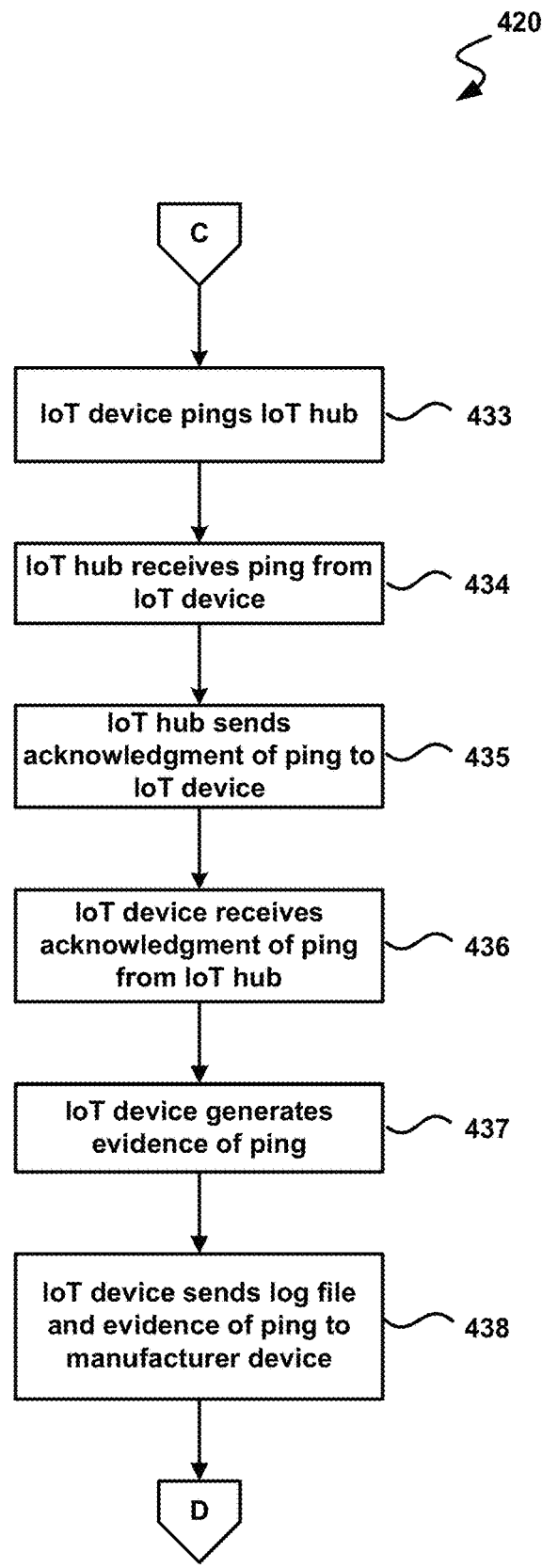
Figure 4D:
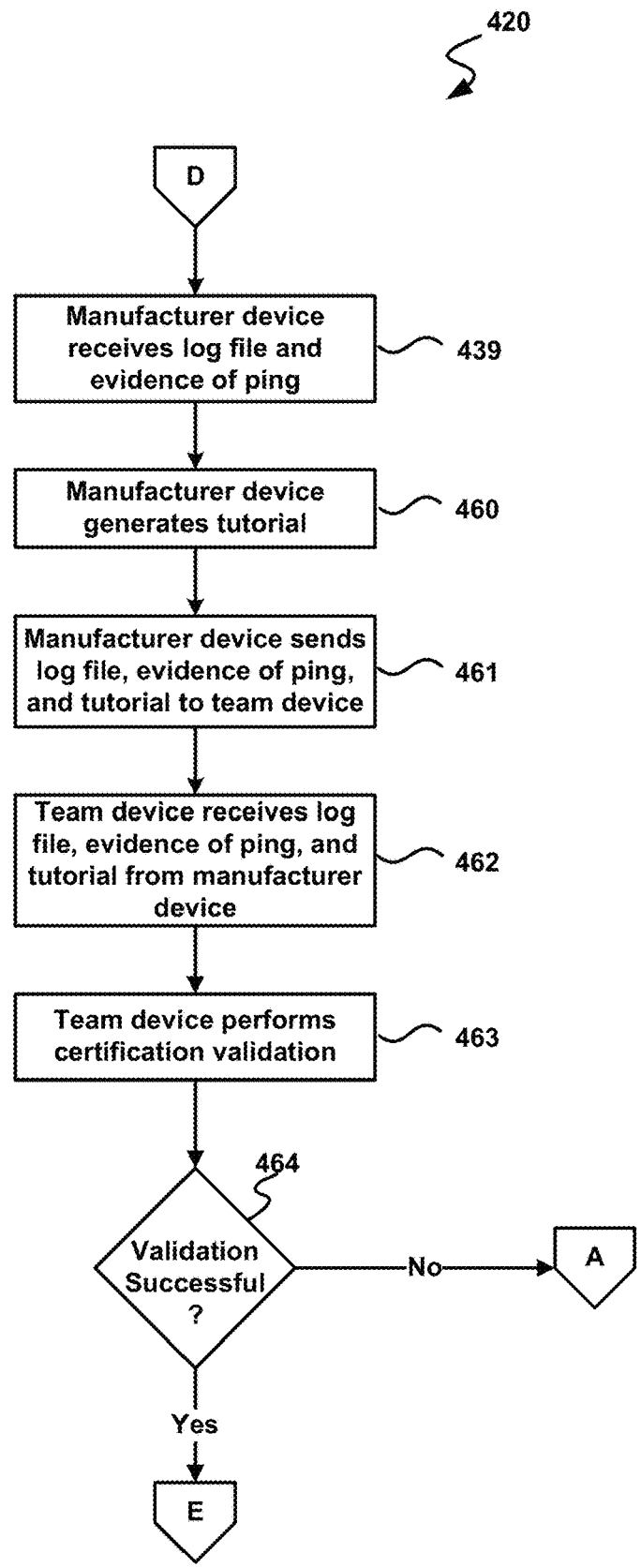
Figure 4E:
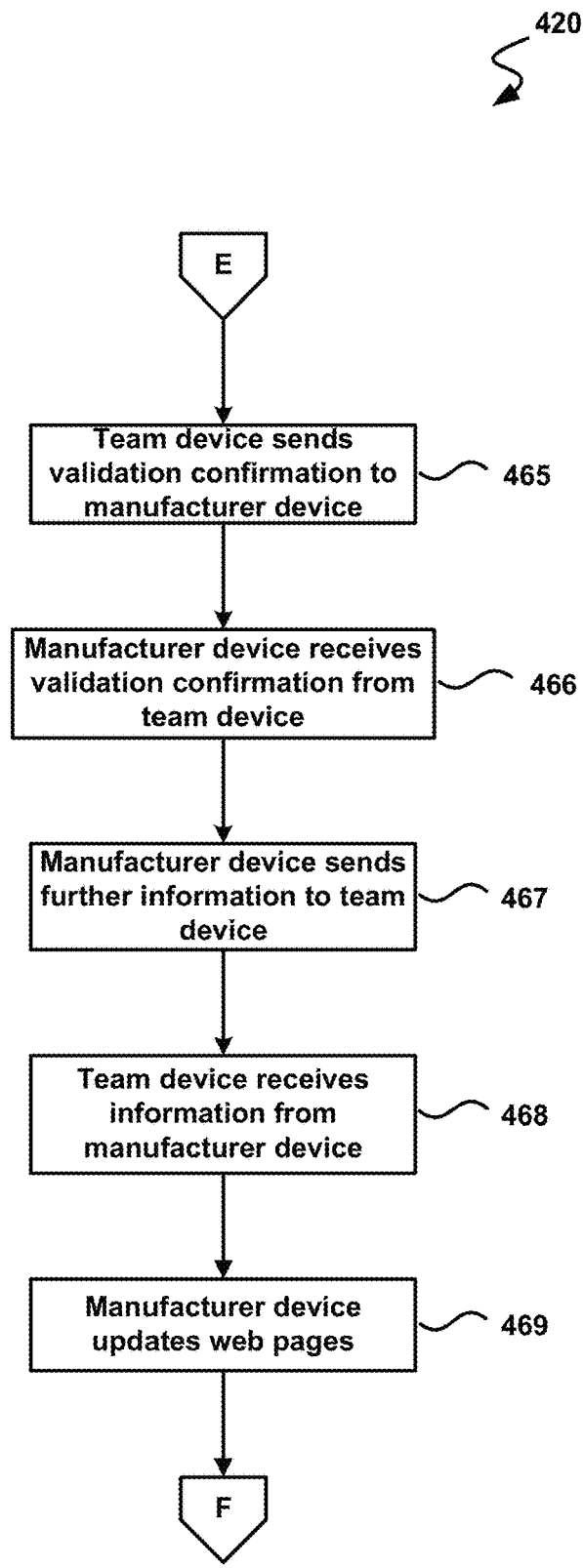
Figure 4F:
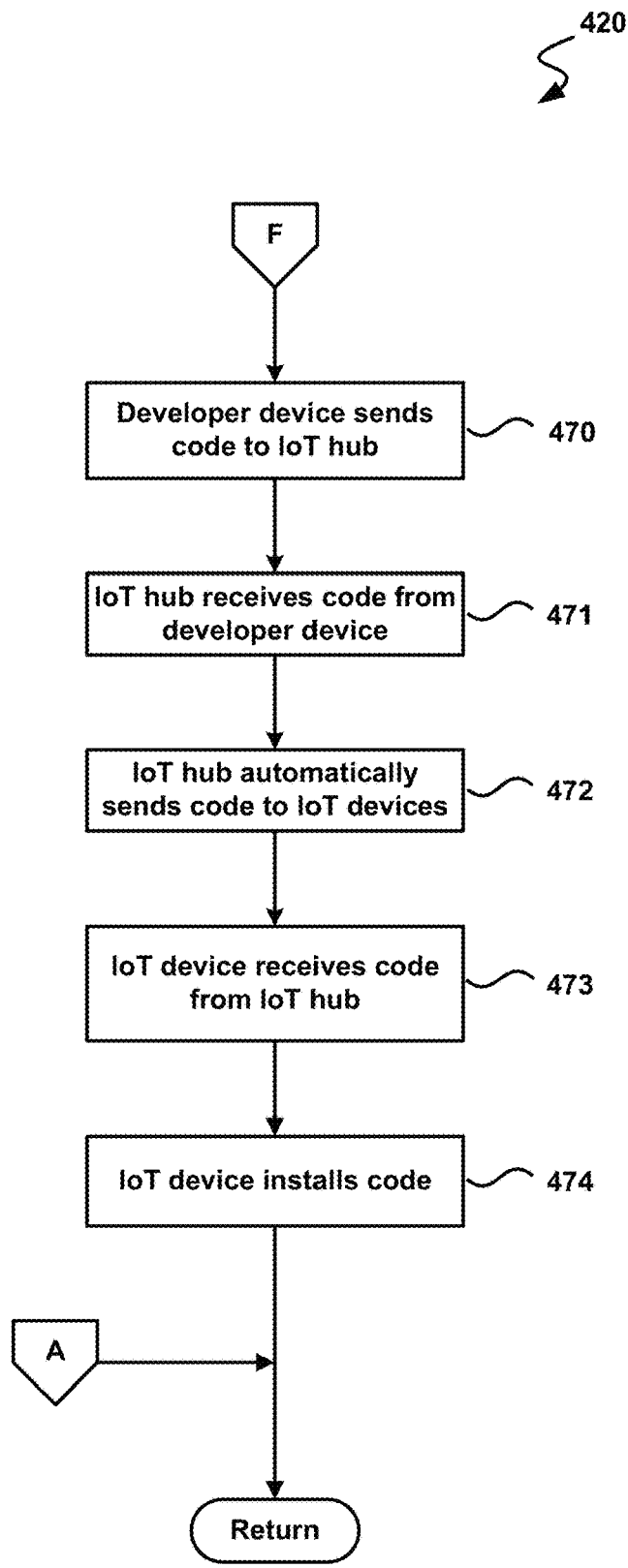

FIG. 3 is a block diagram illustrating an example of a system (300) for hardware IoT certification. System 300 includes network 330, IoT Hubs 351-353, IoT devices 341-343, manufacturer device 311, developer device 313, and team device 314, which all connect to network 330. The term "IoT device" refers to a device intended to make use of IoT services. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including $T_1$, $T_2$, $T_3$, and $T_4$, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT Hubs 351-353, IoT devices 341-343, manufacturer device 311, developer device 313, and team device 314.

As one example, IoT devices 341-343 are hardware devices that are intended to make use of IoT services provided by one or more IoT Hubs, such as IoT Hubs 351-353. In this and other examples, manufacturer device 311 is a device used by a manufacturer of an IoT device (e.g., 341-343) to, inter alia, communicate via network 330. Further, developer device 313 may be a device associated with a developer for the manufacturer of an IoT device used, inter alia, for connection with network 330. Likewise, team device 314 may be a device used by a team, such as a support team or certification team associated with IoT Hubs (e.g., 351-353) for providing hardware IoT certification.

System 300 may include more or less devices than illustrated in FIG. 3, which is shown by way of example only.

In the other technologies, considerable time was required in order for new hardware devices to begin using IoT services from an IoT Hub. It was difficult to signal compatibility between a hardware device with cloud services. Even if compatibility was signaled, the hardware device might not actually be compatible with IoT services. Further, it may be difficult for developers to know which hardware devices are compatible with IoT services and developers may have difficulties in developing software for IoT devices using IoT services. Device heterogeneity may also make using IoT services difficult in.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

FIGS. 4A-4E illustrate a logical flow diagram of a process (420) for hardware IoT certification. FIG. 4 and the corresponding description of FIG. 4 in the specification illustrates an example process for illustrative purposes that does not limit the scope of the disclosure.

After a start block, the process proceeds to block 421. At block 421, a manufacturer makes a certification request. In some examples, manufacturer device 313 sends a certification request to team device 314. In some examples, the manufacturer makes a certification request via a web form. In some examples, the completion of the certification request via the web form triggers an automated email that is sent to team device 314.

In some examples, the web form requests information such as product name, contact, email, role, processor of device, memory of device, description of the device, a descriptive URL for the device, and the like. In some examples, the provided descriptive URL for the device should include a specification for the device. In some examples, the web page that includes the web form from which a manufacturer makes a certification request may also include information about hardware device getting certified for IoT services and may further include access to manuals with information for bootstrapping the devices that are to use IoT services. The information may include information related to how to bootstrap a device that runs a supported version of client libraries, and steps related to how to proceed with bootstrapping the device and the hardware IoT certification process. The information may also include examples, e.g., information relating to other IoT devices or type(s) of IoT devices, in order to simplify the bootstrapping process.

The process then moves to block 422. At block 422, team device 314 receives the certification request. In some examples, team device 314 receives the automated email sent when the manufacturer submits the certification request web form.

The process then moves to decision block 423. At decision block 423, a determination is made as to whether or not the device (e.g., IoT device 341) is eligible for hardware IoT certification. For example, if IoT device 341 is not capable of connecting to a computer network, then IoT device 341 is not eligible for hardware IoT certification. If device 341 is not eligible for hardware IoT certification, then the process advances from decision block 423 to a return block, where other processing is resumed.

Although not shown in FIGS. 4A-4E, if more information is needed in order to determine whether device 341 is eligible for hardware IoT certification, the information may be requested from the manufacturer. Also, although known shown in FIGS. 4A-4E, if device 341 is not eligible for IoT certification, the team may also track or hold the certification request, and may track holds. A conversation may also be initiated with the manufacturer.

If, at decision block 423, a determination is made that the device is eligible for hardware IoT certification, the process proceeds to block 424. At block 424, certification instructions are sent to the manufacturer. In some examples, team device 314 sends certification instructions to manufacturer device 311. In some examples, the certification instructions are part of a certification suite that is sent to the manufacturer. In some examples, the certification suite includes certification instructions, test requirements, a set of templates for the manufacturer to provide a tutorial for the IoT device, a Frequently Asked Questions (FAQ), and the like. In some examples, the certification suite further includes information about the software development kit (SDK), including information about modifying the SDK for the particular IoT device, if necessary. The process then moves to block 425. At block 425, the manufacturer receives the certification instructions.

The process then advances to block 426. At block 426, manufacturer device 311 sends a registration request for IoT device 341 to IoT Hub 351. The process then proceeds block 427. At block 427, IoT Hub 351 receives the registration request. The process then moves to decision block 428. At block 428, a determination is made as to whether or not the registration request is accepted. If not, processing advances from decision block 428 to the return block. If, however, it is determined at decision block 428 to accept the registration request, the process instead proceeds to block 429. At block 429, a registration confirmation is communicated from IoT Hub 351 to manufacturer device 311. The process then moves to block 430. At block 430, manufacturer device 311 receives the registration conformation.

The process then advances to block 431. At block 431, the IoT device 341 pulls a software development kit (SDK) for use with IoT services. As previously discussed, in some examples, the SDK is modified for the particular IoT device 341. For instance, in some examples, the SDK is modified based on the device type. The process then proceeds to block 432. At block 432, IoT device 341 compiles and runs the SDK, as part of a build process for building the software and/or client libraries on the device, and runs unit tests with the SDK. A log file is output as a result of running the unit tests. The unit test may test whether or not the network connection is happening correcting, whether or not there is a certificate problem, whether proper parameters have been installed, and the like. For instance, in some examples, the unit tests may include a connection test, a parameter test, and a certificate test, among other tests. The log file may include time stamps.

The process then moves to block 433. At block 433, IoT device 341 pings IoT Hub 351. In some examples, the ping is a "Hello World" type message. Then process then advances to block 434. At block 434, IoT Hub 351 receives the ping from IoT device 341. The process then proceeds to block 435. At block 435, IoT Hub 351 sends an acknowledgment of the ping to IoT device 341 in response to the ping. In some examples, the acknowledgement is a "Hello World" type message. The process then moves to block 436. At block 436, IoT device 341 receives the acknowledgement of the ping from IoT Hub 351.

For instance, in some example, IoT device 341 sends a "Hello World" ping to IoT Hub 341 (via network 330), and IoT Hub 351 acknowledges the ping by responding with a "Hello World" message back to IoT device 341.

The process then advances to block 437. At block 437, IoT device 341 generates evidence of a successful ping and acknowledgement. For instance, in some examples, IoT device 341 is provided with a tool that may be used to take a screen shot that provides evidence of the ping. The process the proceeds to block 438. At block 438, IoT device 341 sends the log file and the evidence of the ping to manufacturer device 311. The process then moves to block 439. At block 439, the manufacturer device receives the log file and the evidence of the ping. The process then proceeds to block 460. At block 460, manufacturer device 311 generates a tutorial for IoT device 341. The process then advances to block 461. At block 461, manufacturer device 311 sends the log file, the evidence of the ping, and the tutorial to team device 314.

The process then proceeds to block 462. At block 462, team device 314 receives the log file, the evidence of the ping, and the tutorial from manufacturer device 311. The process then moves to block 463. At block 463, certification validation is performed using team device 314 based upon the received log file, evidence of the ping, and the tutorial. The process then advances to decision block 464. At decision block 464, a determination is made as to whether validation is successful. The determination at decision block 464 includes validation of the unit tests via checking the log file for errors and warnings, validation of the evidence of the ping, and validation of the instructions in the tutorial. If, at decision block 464, the validation is not successful, the process proceeds to the return block. Although not shown in FIGS. 4A-4E, in some examples, if the validation is not successful, support may be provided to the manufacturer to assist the manufacturer in updating a certification request.

If instead validation is successful at decision block 464, the process moves to block 465. At block 465, validation confirmation is sent from team device 314 to manufacturing device 311. In some examples, in addition to sending validation confirmation to manufacturing device 311, technical onboarding information and/or marketing onboarding information may be sent to the manufacturer. The marketing onboarding information may include, in some examples, public relations guidelines, badge file, badge files guidelines, a program agreement, and/or a request for the manufacturer's logo and/or URL intended for publication on a web page for hardware IoT certification.

The process then advances to block 466. At block 466, manufacturing device 311 receives the validation confirmation from team device 314. The process then advances to block 467. At block 467, manufacturer device 311 sends further information to team device 314, including, optionally, the preferred logo and company information. The process then proceeds to block 468. At block 468, team device 314 receives the information from manufacturer device 311.

The process then proceeds to block 469. At block 469, the manufacturer updates one or more web pages as necessary, for example, updating technical information and device information for IoT device 341 on one or more web pages, and placing the company logo indicating certification of IoT device 341 on one or more web page. At this stage, the manufacturer may perform additional marketing and technical steps and/or update marketing and/or technical information as needed. Further, at this point, certification has been validated. IoT Hub 351 may now provide full IoT services for IoT device 341, including secure bidirectional communication between IoT Hub 351 and IoT device 341. Bidirectional communication between IoT device 341 and IoT Hub 351 is now possible in a secure manner, and compatibility and connectivity is ensured. Bidirectional communication may also happen in an automated manner. For instance, in some examples, IoT device 341 can be updated automatically based on information received from IoT Hub 351, and IoT device 341 can provide information automatically to IoT Hub 351.

The process then moves to block 470. At block 470, developer device 313 sends code to IoT Hub 351. For example, the developer may wish each IoT device of a particular type to automatically receive particular code from the IoT Hub and then for the code to be installed on each of these IoT devices. The process then advances block 471. At block 471, IoT Hub 351 receives the code from developer device 313. The process then advances to block 472. At block 472, IoT Hub 351 automatically communicates code to each IoT device of a particular type, including IoT device 341. Then process then moves to block 473. At block 473, IoT device 341 receives code from IoT Hub 351. The process then proceeds to block 474. At block 474, IoT device 341 installs the code, e.g., automatically. The process then moves to a return block, where other processing is resumed.

Although not shown in FIGS. 4A-4E, after an IoT device has been validated, any IoT device of the same type (i.e., same manufacturer, same model) may now connect to the IoT Hub and begin receiving IoT services. In some examples, each new IoT device of a type that has been validated connects to the IoT Hub to begin receiving IoT services, the IoT device sends the device ID of the IoT device to the IoT Hub, the developer device sends a message to the IoT Hub requesting the device ID of the IoT device, and the IoT Hub sends the requested device IoT to the developer device.

Although not shown in FIGS. 4A-4E, process 420 may be iterated multiple times, each time for a different type of IoT device. For example, process 420 may be performed a first time for a first type of IoT device, and then performed a second time for a second type of IoT device (which may be a second type of device from the same manufacturer, or may instead be a device from a different manufacturer.)

Examples of process 420, using system 300, allow new hardware devices to begin using IoT services from an IoT Hub relatively quickly. Further, process 420 allows compatibility between a hardware device with cloud services to be signaled relatively quickly, with compatibility ensured upon relatively simple validation. Process 420 provides a simple way for manufacturers to test their hardware devices with IoT services. Process 420 provides certification that allows manufacturers to claim compatibility with IoT services via a set of instructions that allows manufacturers to test compatibility. Further, developers can easily determine which hardware devices are compatible with IoT services and are provided with tools for readily developing software for IoT devices using IoT services.

Process 420 illustrates a method for the entire system 300. Each device in system 300 may, part of the overall process for the system, performs a process that is a subset of process 420. For instance, IoT Hub 341 performs the following method in one example. After a start block, the process proceeds to block 427. At block 427, a registration request is received. The process then moves to decision block 428. At decision block 428, a determination is made as to whether or not the registration request is accepted. If not, processing advances from decision block 428 to the return block, where other processing is resumed.

If, however, it is determined at decision block 428 to accept the registration request, the process instead proceeds from block 428 to block 429. At block 429, a registration confirmation is sent to the manufacturer device. The process then moves to block 434. At block 434, a ping is received from the IoT device. The process then advances to block 435. At block 435, an acknowledgement of the ping is sent to the IoT device. The process the proceeds to block 471. At block 471, code is received from a developer device. The process the moves to block 472. At block 472, the code is automatically sent to each IoT device of a particular type. The process then moves to a return block, where other processing is resumed.

Also, IoT device 341 performs the following method in one example. After a start block, the process proceeds to block 431. At block 431, an SDK is pulled for use with IoT services. The process then moves to block 432. At block 432, the SDK is compiled and run as part of a build process for building the software and/or client libraries on the device, and unit tests are run with the SDK. A log file is output as a result of running the unit tests. The process then advances to block 433. At block 433, the IoT Hub is pinged.

The process then proceeds to block 436. At block 436, an acknowledgement of the ping is received from the IoT Hub. The process then moves to block 437. At block 437, evidence of a successful ping and acknowledgment is generated. The process then advances to block 438. At block 438, the log file and the evidence of the ping are sent to the manufacturer device. The process then proceeds to block 473. At block 473, code is received from the IoT Hub. The process then moves to block 474. At block 474, the code is installed, e.g., automatically. The process the moves to a return block, where other processing is resumed.

Also, manufacturer device 311 performs the following method in one example. After a start block, the process proceeds to block 421. At block 421, a certification request is made. The process then moves to block 425. At block 425, the manufacturer receives certification instructions. The process then advances to block 426. At block 426, a registration request for the IoT device is sent to the IoT Hub. The process then proceeds to block 430. At block 430, registration information is received.

The process then moves to block 460. At block 460, a tutorial is generated for the IoT device. The process then advances to block 461. At block 461, the log file, the evidence of the ping, and the tutorial are sent to the team device. The process the proceeds to block 466. At block 466, the validation confirmation is received from the team device. The process then proceeds to block 467. At block 467, further information is sent to the team device, including, optionally, the preferred logo and company information. The process the moves to a return block, where other processing is resumed.

Also, developer device 313 performs the following method in one example. After a start block, the process proceeds to block 470. At block 470, code is sent to the IoT Hub. For example, the developer may wish each IoT device of a particular type to automatically receive particular code from the IoT Hub and then for the code to be installed on each of these IoT devices. The process the moves to a return block, where other processing is resumed.

Also, team device 314 performs the following method in one example. After a start block, the process proceeds to block 422. At block 422, a certification request is received. The process then moves to decision block 423. At decision block 423, a determination is made as to whether or not the IoT device is eligible for hardware IoT certification. If not, the process advances to a return block, where other processing is resumed. If, at decision block 423, a determination is made that the IoT device is eligible for hardware IoT certification, the process proceeds to block 424.

At block 424, certification instructions are sent to the manufacturer device. The process then moves to block 462. At block 422, the log file, the evidence of the ping, and the tutorial are received from the manufacturer device. The process then advances to block 463. At block 463, certification validation is performed based upon the received log file, evidence of the ping, and the tutorial. The process then proceeds to decision block 464. At decision block 464, a determination is made as to whether the validation is successful. If, at decision block 464, the validation is not successful, the process proceeds to the return block.

If instead validation is successful at decision block 464, the process moves to block 465. At block 465, validation confirmation is sent to the manufacturing device. The process then advances to block 468. At block 468, information is received from the manufacturer device. The process then proceeds to block 469. At block 469, one or more web pages are updated as necessary, for example updating technical information and device information for the IoT device on one or more web pages, and placing the company logo indicating certification of IoT device on one or more web page. At this stage, the manufacturer may perform additional marketing and technical steps and/or update marketing and/or technical information as needed. Further, at this point, certification has been validated. The process the moves to a return block, where other processing is resumed.

Figure 5:
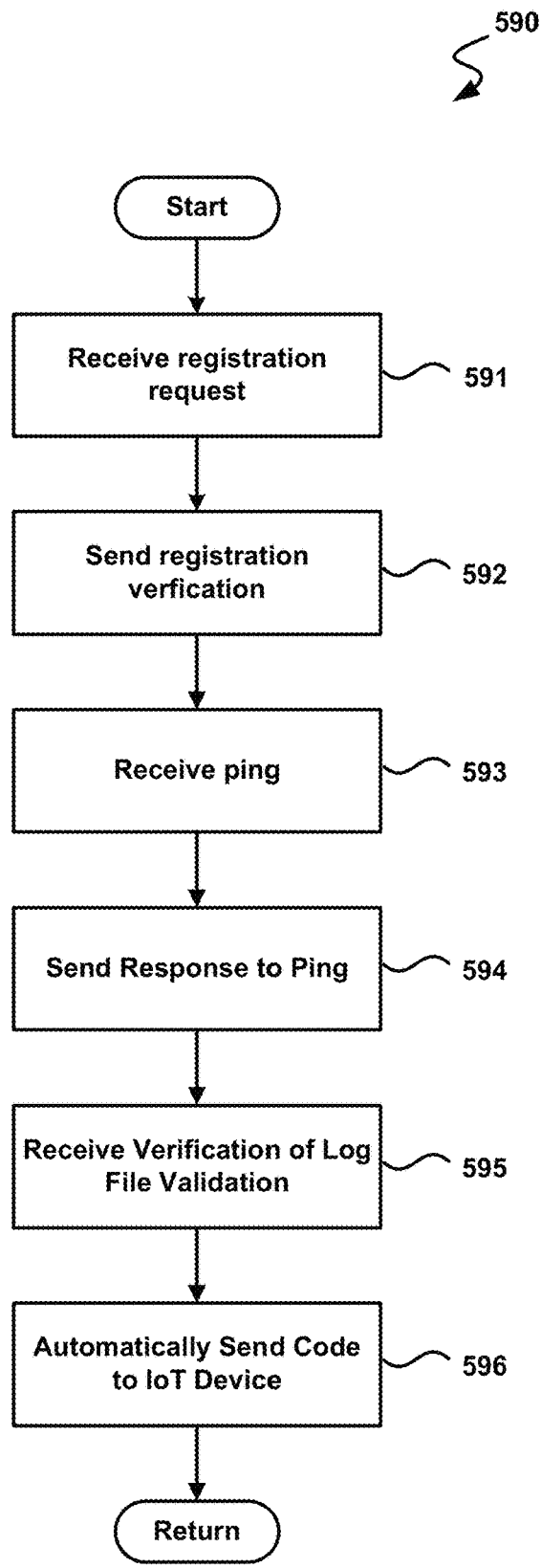
FIG. 5 is a logical flow diagram illustrating an example of a process for hardware IoT certification.

FIG. 5 is a logical flow diagram illustrating process 590 for hardware certification. After a start block, the process proceeds to block 591. At block 591, a registration request is received. The process then moves to block 592. At block 592, a registration verification is sent. The process then advances to block 593. At block 593, a ping is received. The process then proceeds to block 594. At block 594, a response to the ping is sent. The process then moves to block 595. At block 595, verification of a validation of a log file output by a device based on running a plurality of unit tests on a device with a software development kit is received. The process then advances to block 596. At block 596, code is automatically sent to the IoT device. In some examples, the code is installed onto the first IoT device providing additional functionality thereto. The process then proceeds to a return block, where other processing is resumed.

Figure 6:
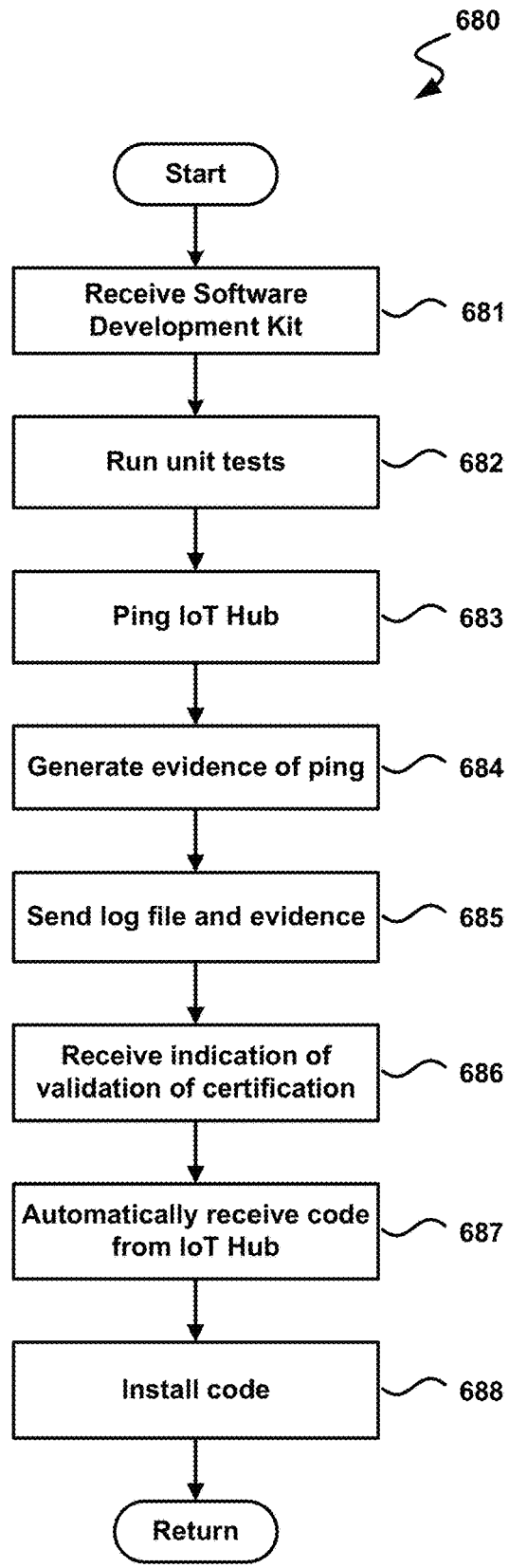
FIG. 6 is a logical flow diagram illustrating another example of a process for hardware IoT certification, in accordance with aspects of the present disclosure.

FIG. 6 is a logical flow diagram illustrating process 680 for hardware certification. After a start block, the process proceeds to block 681. At block 681, a software development kit (SDK) is received. For instance, in some examples, the SDK is received at a device to be verified as operational with an IoT hub. The process then moves to block 682. At block 682, a plurality of unit tests with the SDK is run, such that a log file is output. The process then advances to block 683. At block 683, an IoT Hub is pinged. The process then proceeds to block 684.

At block 684, evidence of pinging the IoT Hub is generated. The process then moves to block 685. At block 685, the log file and the evidence is sent for validation of certification. The process then advances to block 686. At block 686, an indication of validation of certification for the log file and the evidence is received. The process then proceeds to block 687. At block 687, code is automatically received from the IoT Hub. The process then moves to block 688. At block 688, the code is installed, e.g., automatically. The process then advances to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. A method for hardware certification, comprising:
receiving a registration request;
sending a registration verification in response to the registration request;
receiving a ping from a first Internet-of-Things (IoT) device of a first type;
sending a response to the ping to the first IoT device;
receiving verification of a validation of an output by the first IoT device based on running a plurality of tests on the first IoT device; and
automatically sending code to the first IoT device, wherein the code is installed onto the first IoT device.

2. The method of claim 1, wherein the method further comprises receiving code from a developer device.

3. The method of claim 1, wherein the method further comprises:
receiving another registration request associated with a second type of Iot device; sending a registration verification for the second type of IoT device; receiving a ping from a first IoT device of the second type; sending a response to the ping to the first IoT device of the second type; receiving verification of a validation of an output by the first IoT device of the second type based on running a plurality of tests on the first IoT device of the second type; and automatically sending code to the first IoT device of the second type.

4. The method of claim 1, wherein the method further comprises:
receiving, from a developer device, a request for a device identification associated with the first IoT device; and
sending the device identification to the developer device in response to the request for the device identification.

5. The method of claim 1, wherein the plurality of tests includes a connection test, a parameter test, and a certificate test.

6. The method of claim 1, wherein the method further comprises providing IoT services to the first IoT device after receiving the verification, wherein the IoT services include secure, bidirectional communication to and from the first IoT device.

7. The method of claim 6, wherein the method further comprises providing the IoT services to a plurality of additional IoT devices of the first type.

8. An apparatus for hardware certification, comprising:
an operating memory adapted to store run-time data for the apparatus; and
at least one storage memory and at least one processor that are respectively adapted to store and execute processor-executable code that, in response to execution, enables the apparatus to perform actions, including:
communicating a registration verification in response to a registration request;
receiving a ping from a first Internet-of-Things (IoT) device of a first type;
sending a response to the ping to the first IoT device;
receiving verification of a validation of an output by the first IoT device based on a plurality of tests run on the first IoT device; and
automatically communicating code to the first IoT device, wherein the code is installed onto the first IoT device providing functionality thereto.

9. The apparatus of claim 8, wherein the actions further comprise receiving the code from a developer device.

10. The apparatus of claim 8, wherein the actions further comprise:
receiving another registration request associated with a second type of IoT device;
sending a registration verification for the second type of IoT device;
receiving a ping from a first IoT device of the second type;
sending a response to the ping to the first IoT device of the second type;
receiving verification of a validation of an output by the first IoT device of the second type based on running a plurality of tests on the first IoT device of the second type; and
automatically sending code to the first IoT device of the second type.

11. The apparatus of claim 8, wherein receiving the ping from the first IoT device includes receiving an initial message, and wherein sending the response to the ping to the first IoT device includes sending a response to the initial message to the first IoT device.

12. The apparatus of claim 8, wherein the actions further comprise:
receiving, from a developer device, a request for a device identification associated with the first IoT device; and
sending the device identification to the developer device in response to the request for the device identification.

13. The apparatus of claim 8, wherein the plurality of tests includes a connection test, a parameter test, and a certificate test.

14. The apparatus of claim 8, wherein the actions further comprise providing IoT services to the first IoT device after receiving the verification, wherein the IoT services include secure, bidirectional communication to and from the first IoT device.

15. The apparatus of claim 14, wherein the actions further comprise providing the IoT services to a plurality of additional IoT devices of the first type.

16. A processor-readable storage medium having instructions stored thereon for causing a computing device to perform operations for hardware certification, the operations comprising:
    communicating a registration verification in response to a registration request;
    receiving a ping from a first Internet-of-Things (IoT) device of a first type;
    sending a response to the ping to the first IoT device;
    receiving verification of a validation of an output by the first IoT device based on a plurality of tests run on the first IoT device; and
    automatically communicating code to the first IoT device, wherein the code is installed onto the first IoT device providing functionality thereto.

17. The processor-readable storage medium of claim 16, wherein the operations further comprise:
    receiving another registration request associated with a second type of IoT device;
    sending a registration verification for the second type of IoT device;
    receiving a ping from a first IoT device of the second type;
    sending a response to the ping to the first IoT device of the second type;
    receiving verification of a validation of an output by the first IoT device of the second type based on running a plurality of tests on the first IoT device of the second type; and
    automatically sending code to the first IoT device of the second type.

18. The processor-readable storage medium of claim 16, wherein receiving the ping from the first IoT device includes receiving an initial message, and wherein sending the response to the ping to the first IoT device includes sending a response to the initial message to the first IoT device.

19. The processor-readable storage medium of claim 16, wherein the operations further comprise:
    receiving, from a developer device, a request for a device identification associated with the first IoT device; and
    sending the device identification to the developer device in response to the request for the device identification.

20. The processor-readable storage medium of claim 16, wherein the operations further comprise:
    providing IoT services to a plurality of additional IoT devices of the first type.

\* \* \* \* \*